Figure 1:
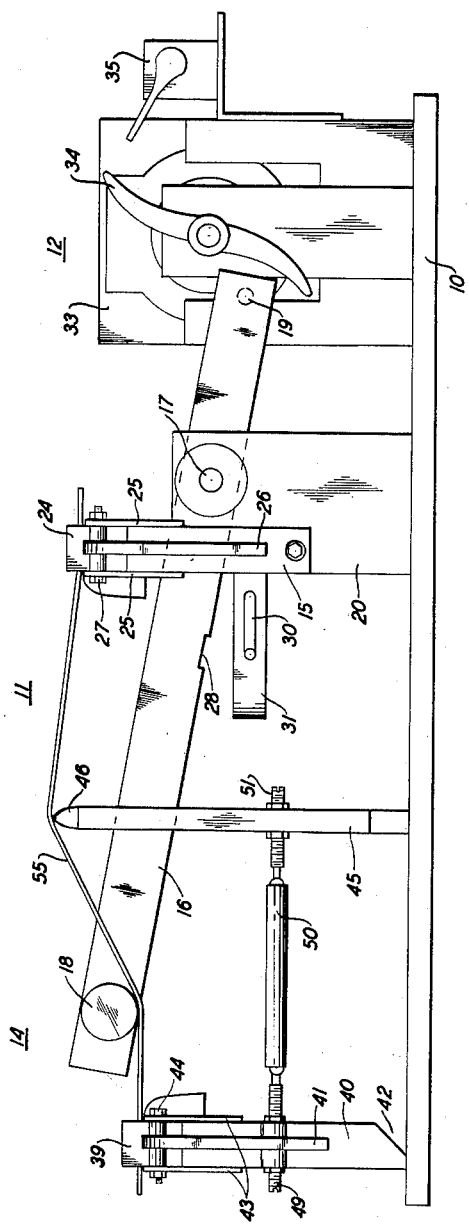

Feb. 18, 1964     E. O. BAUER     3,121,320

MATERIALS TESTING DEVICE

Filed March 29, 1961     3 Sheets-Sheet 1

INVENTOR.
E.O. BAUER
BY John C. Morris

ATTORNEY

Feb. 18, 1964

E. O. BAUER 3,121,320

MATERIALS TESTING DEVICE

Filed March 29, 1961

3 Sheets-Sheet 2

INVENTOR.
E.O. BAUER

BY John C. Morris

ATTORNEY

Feb. 18, 1964 E. O. BAUER 3,121,320
MATERIALS TESTING DEVICE
Filed March 29, 1961 3 Sheets-Sheet 3

INVENTOR.
E.O. BAUER
BY John C. Moris

ATTORNEY

United States Patent Office 3,121,320
Patented Feb. 18, 1964

3,121,320
MATERIALS TESTING DEVICE
Erich O. Bauer, East Orange, N.J., assignor to Bell Telephone Laboratories, Incorporated, New York, N.Y., a corporation of New York
Filed Mar. 29, 1961, Ser. No. 99,181
5 Claims. (Cl. 73—7)

This invention relates to apparatus for testing the physical properties of plastic materials.

It is known that the individual physical properties of materials may be separately tested by using testing procedures such as weighted knives to evaluate cut-through properties, controlled interfacial scuffing to evaluate abrasion resistance, and gravity-drop hammering devices to evaluate impact resistance. Often, however, it is desired to make a single test which represents a cumulative evaluation of several individually attainable test results. One such case is where it is desired to ascertain the physical performance of electrical conductor insulation material under certain conditions to which such insulated conductors are normally subjected in standard manufacturing processes. It has heretofore been the practice in such cases to make individual tests of the several physical properties which are known to be operative under those conditions, and then to integrate the results of the tests. This, however, is a time consuming and tedious process, not well suited for making spot checks on "in process" material. A possible alternative procedure is to make a cumulative evaluation by subjecting "in process" samples, such as samples of insulated electrical conductor, to a simulation of the physical abuse which they will encounter in the starting and stopping of insulating or cabling machines, for example, where the covering of insulation material is subjected to severe conditions of impact and cut-through delivered to it at the conductor-covering interface by the core conductor. An obvious method of simulating this condition on actual test samples might be to deliver periodic impact to insulated wire samples at a midpoint location between supporting anvils. However, experience shows that using this method, the conductor will usually snap before cut-through of relatively tough insulation material occurs at the anvil locations.

It is an object of this invention to provide a means whereby plastic materials may be rapidly tested for their cumulative resistance to certain conditions of physical abuse.

More particularly, it is an object of this invention to provide a means for testing the cumulative resistance of plastic conductor insulation materials to cut-through and impact.

This invention achieves these objects by causing a core body to deliver, from varying directions, successive impulses to the plastic material being tested. Directional variation is achieved by varying the location of a narrow surface supporting the plastic as the successive impulses are delivered by the core. The effect of the directional variation achieved thereby is to maintain a relatively high ratio between the bearing pressure of the core on the plastic material, and the bearing surface offered to the core by the plastic material, thereby accelerating the speed with which the core penetrates the plastic.

Figure 2:
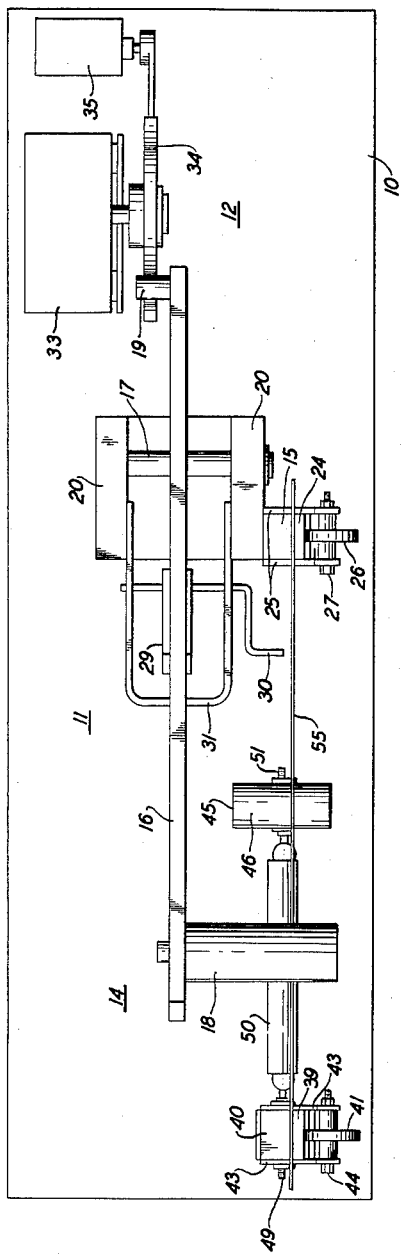
Figure 4:
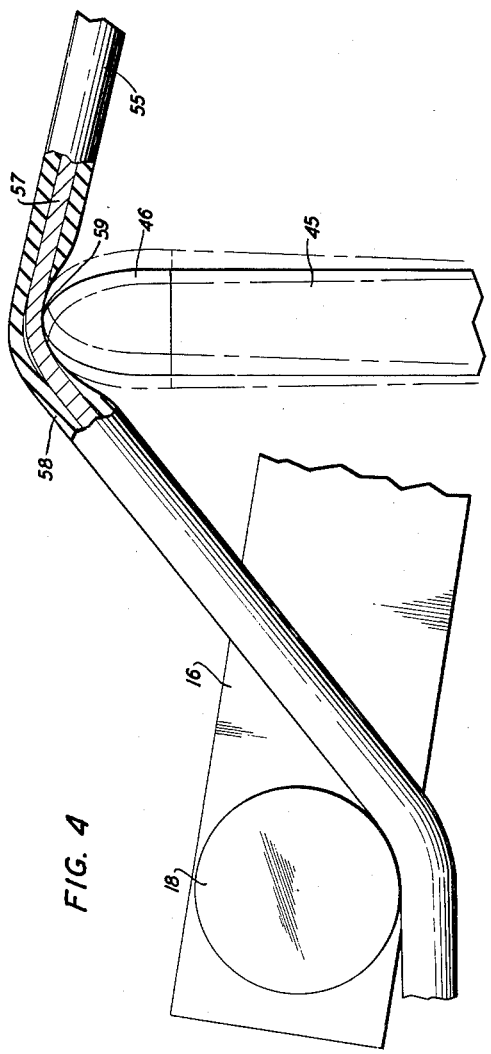
Figure 3:
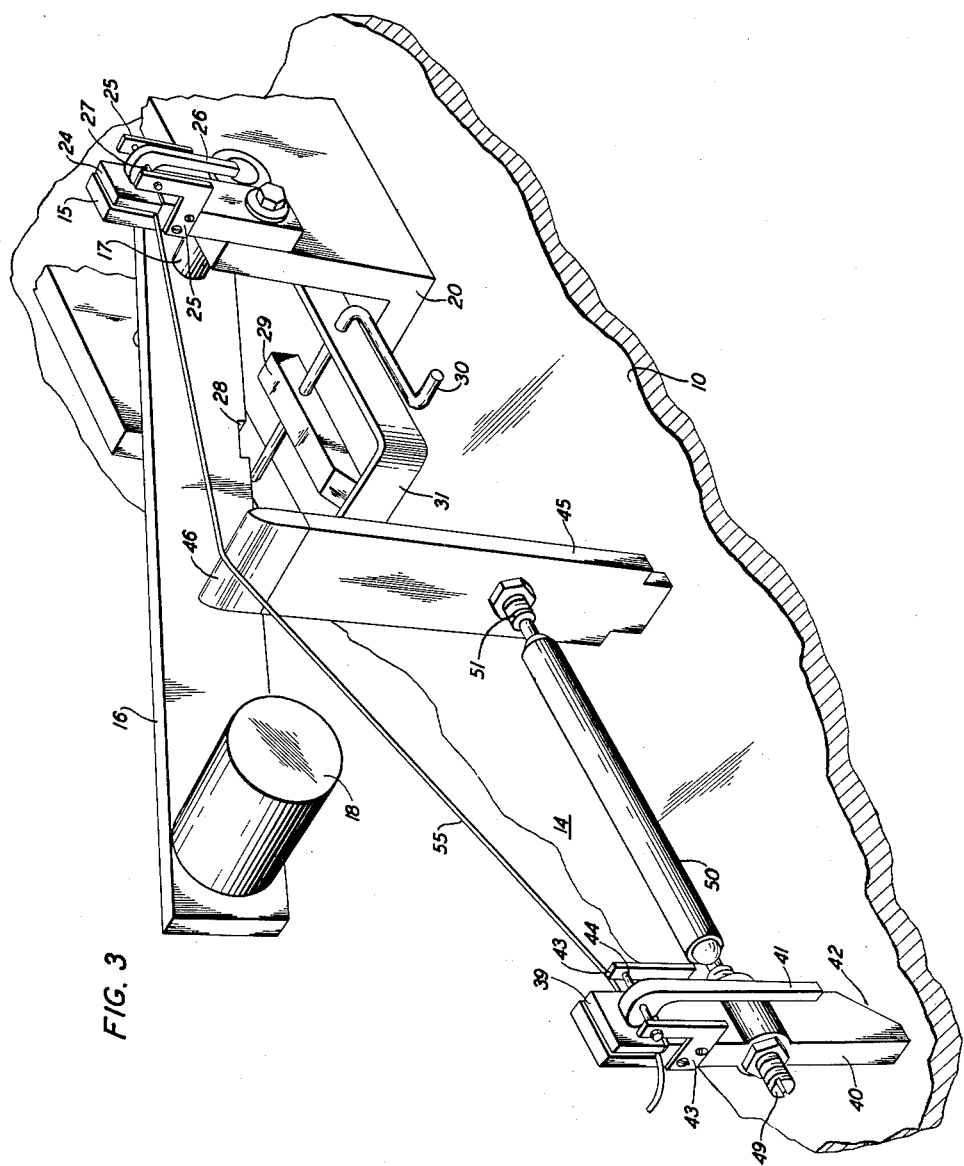

This invention can be more clearly understood by reference to the attached drawing in which is shown one embodiment of this invention, illustrating a device for testing electrical conductor covering material wherein:

FIG. 1 is an elevational view;
FIG. 2 is a plan view;
FIG. 3 is a perspective view of detail of the clamp support-anvil group; and
FIG. 4 is a view of anvil and hammer detail.

Referring first to FIGS. 1 and 2; illustrated therein is a supporting base 10 on which are mounted three general groupings of apparatus; a weight arm group 11, a weight arm activator group 12, and an anvil group 14. The weight arm group 11 comprises a rigid supporting post 15 bolted to one arm of a U-shaped support frame 20 which is rigidly affixed to the base 10, a weight arm 16 movably affixed to the supporting frame 20 by means of an axle 17 located near the center of the arm, a cylindrical weight 18 affixed to one end of the weight arm, and a cam follower 19 affixed to the other end of the weight arm. Clamp braces 25 are affixed to the top of the supporting post 15 and support a clamp handle 26 by means of a through bolt 27. The clamp handle has a cammed surface which bears on a clamp plate 24, which plate is biased away from the supporting post 15 by means of springs (not shown). When the handle 26 is in the downward position, the cammed surface causes the plate 24 to move toward the post 15, thereby providing a means whereby one end of a test sample can be securely clamped to the support frame 20. The underside of the weight arm 16 has a notch 28 for reception of the end of a positioning arm 29 which is movably affixed to a U-shaped frame mount 31 and may be raised by means of a crank 30 so that the end of the positioning arm 29 resides in the notch 28. Thereby the weight arm may be supported so that the weight end of the arm is retained in an elevated position.

The weight arm activator group 12 includes a motor 33 driving a cam 34 which is so positioned that it will (in sequence) engage, depress, and release the cam follower 19 once for each half revolution of the cam. A counter device 35 is so positioned that it will be actuated once for each half revolution of the cam.

The anvil group 14 includes a vertical clamp support bar 40 affixed to the base 10 and having affixed to it, near its top end, a second clamp device like that affixed to the weight arm group 11, and similarly comprising clamp braces 43 supporting a clamp handle 41 by means of a through bolt 44, and a clamp plate 39 and biasing springs (not shown). The vertical clamp bar 40 has a beveled face 42 cut near the base end and facing toward the weight arm group 11. Midway between the vertical clamp bar 40 and the weight arm group 11 is a vertical anvil support bar 45 affixed to the base 10 at its bottom end and having affixed to it, at its top end, a curved anvil 46. Affixed to the vertical clamp bar 40 by means of a through bolt 49 is an articulated connecting bar 50, which is also secured to the vertical anvil support bar 45 by means of a second through bolt 51. The connecting bar 50 joins the clamp bar 40 and the anvil support bar 45 near their respective midpoints.

In operation, a sample 55 of plastic covered conductor is secured in one of the clamp devices, is positioned over the face of the anvil 46, and is secured in the other clamp device. The counter 35 is then set and the motor 33 turned on. This causes the cam 34 to revolve; and as it does so, it engages the cam follower 19 and depresses it, causing the weight arm to raise so that the notch 28 moves free of the positioning arm 29 allowing the positioning arm to drop flat so that it will not thereafter impede the motion of the weight arm 16. The cam 34 continues to turn, depressing the cam follower end of the weight arm until such time as the cam moves free of engagement with the cam follower 19, thereby releasing it. At that time the weight 18, which was raised by the corresponding depression of the cam follower 19, drops by gravity and collides with the wire sample 55 in the midspan area. Simultaneously, with depression of the weight arm, the turning cam 34 actuates the counter 35, thereby recording the number of impulses delivered to the wire sample 55.

Referring to FIG. 4, it will be seen that the effect of the weight 18 dropping on the mid-span of the wire sample 55 is to tension the conductor 57 thereby causing it to exert a sudden force at the conductor-insulation interface 59 in the region where the anvil 46 bears on the outer surface of the covering material 58. This tends to cause the conductor to cut through the covering material 58. Now referring to FIGS. 1, 2 and 3 of the drawing, it will be seen that because the base end of the clamp bar 40 is cut at an angle to produce a beveled face 42 which faces in a direction roughly corresponding to that of the delivered moment of force as the conductor is tensioned, the clamp bar 40 tends to collapse toward the weight arm group 11. But since the clamp bar is appropriately affixed to the base, the bar tends to spring back upright; thus the collapsing motion is converted into a vibratory movement. This movement is transmitted from the clamp bar 40 to the anvil support bar 45 by means of the connecting bar 50. The vibration of the anvil support bar 45 which is induced thereby, causes the anvil 46 to vibrate along the outer surface of the material 58 covering the wire sample. Simultaneously, the weight bouncing on the wire sample 55 causes the conductor 57 to deliver successive, albeit diminishing, impulses to the inner surface of the covering material. These repeated impulses, acting in concert with the shifting of position of the anvil 46, circumvent the tendency of the inner surface of the covering material to conform with the contour of the conductor in the anvil region, thereby maintaining a high bearing pressure to bearing surface ratio. The effect of this is to accelerate the rate at which the conductor cuts through the covering material and is similar to the acceleration achieved by "rocking" a knife blade through a semi-solid material. When sufficient penetration of the conductor through the insulation has taken place, an electrical circuit (not shown) is completed between the anvil 46 and the sample conductor 57, thereby causing the motor 33 to stop operating. The number of impulses then recorded on the counter device 35 may be noted and recorded for purposes of comparative evaluation.

It should be understood that this invention is suitable for the testing of plastic materials generally and is by no means limited to materials extruded over electrical conductors or other wire-like cores. Thus this invention could be used, for example, to test the physical properties of material fabricated in appropriate sheet-like form by bonding it to wire mesh and cutting it into strips to be used as test samples.

Thus it should be understood that the device herein described is but one embodiment of this invention and that other embodiments may be made by those skilled in the art without departing from the spirit and scope of this invention.

What is claimed is:

1. In a device for testing material applied as a covering on a wire, a stationary fastening means for fastening a first end of said wire; a second fastening means for retentively fastening a second end of said wire to a freely vibratory fastener support; a narrow anvil affixed to a freely vibratory anvil support, said anvil being positioned between said stationary and said second fastening means and supporting said covered wire by bearing on said covering material; means for transmitting vibratory motion from said fastener support to said anvil support; and a weight affixed to a movable weight support means whereby said weight may be raised and allowed to drop by gravity on said covered wire at a location between said second fastening means and said anvil.

2. In an electrical wire insulation testing apparatus, a rigid base; a weight arm assembly positioned near the middle of said base, said weight arm assembly comprising a weight arm having a weight affixed to one of its ends, said weight arm being movably affixed to a rigid supporting frame by means of an axle, said supporting frame being rigidly affixed to said base, said supporting frame having affixed thereto a clamp for retentively holding a first end of a test sample of insulated electrical conductor; a weight arm activator assembly positioned near one end of said base, said activator assembly comprising an S-shaped cam driven by an electric motor, said activator assembly being so located that said cam will sequentially contact, depress, and disengage a cam follower affixed to the unweighted end of said weight arm once for each half revolution of said cam; and a vibratory assembly positioned near the end of said base opposite from said activator assembly, said vibratory assembly comprising a clamp bar, a connecting bar, and an anvil supporting bar; said clamp bar being positioned vertically to said base, said clamp bar having affixed to its top end a clamp for retentively holding a second end of said test sample of insulated electrical conductor, said clamp bar having a beveled face at its bottom end at the side facing said weight arm assembly, said clamp bar being vibratorily affixed to said base at said beveled end; said anvil supporting bar being vibratorily affixed to and vertical to said base at a location between said clamp bar and said weight arm assembly, said anvil supporting bar having a curved anvil affixed to its top end; and said connecting bar being movably affixed to said clamp bar and said anvil supporting bar near their respective centers.

3. In a device for testing the physical properties of a sample of a material applied as a core covering, a stationary means for securing a first end of said covered core; a second securing means for retentively securing a second end of said covered core, said second securing means being freely vibratory; a freely vibratory anvil positioned between the first and said second securing means and bearing on the outer surface of said sample of material; means for transmitting vibratory motion from said second securing means to said anvil; and means for delivering impact to said covered core at a place between said second securing means and said anvil.

4. A plastic material testing device comprising a stationary clamp for holding a first end of a sample of said plastic material applied to a metal supporting member; a second clamp for holding a second end of said sample, said second clamp being rigidly secured to a freely vibratory clamp support post; an anvil intermediate said stationary clamp and said second clamp, said anvil being rigidly secured to a freely vibratory anvil support post and supporting said sample by bearing on said plastic material; a vibration transmitting means connecting said clamp support post and said anvil support post; and a hammer means for delivering impact to said sample intermediate said second clamp and said anvil location.

5. A device for testing the physical characteristics of a wire covering material comprising a vibratile anvil, a fixed and a vibratile clamp on opposite sides of the anvil for supporting a covered wire upon the anvil, means for linking and transferring vibratory motion from the vibratile clamp to the anvil, and means for applying impacts to the wire intermediate the vibratile clamp and the anvil and on the side opposite to the anvil.

References Cited in the file of this patent
UNITED STATES PATENTS

| 1,108,928 | Nickerson | Sept. 1, 1914 |
| 2,028,190 | Burns | Jan. 21, 1936 |

OTHER REFERENCES

German application 1,055,768, printed April 23, 1959.